(12) United States Patent
Mitsumori et al.

(10) Patent No.: US 7,185,349 B2
(45) Date of Patent: Feb. 27, 2007

(54) BIAXIAL ACTUATOR APPARATUS AND A METHOD FOR MOUNTING AND ADJUSTING THE BIAXIAL ACTUATOR

(75) Inventors: Koji Mitsumori, Chiba (JP); Shigekazu Yamamoto, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/188,903

(22) Filed: Jul. 26, 2005

(65) Prior Publication Data

US 2005/0265142 A1 Dec. 1, 2005

Related U.S. Application Data

(62) Division of application No. 10/398,688, filed as application No. PCT/JP02/08302 on Aug. 15, 2002, now Pat. No. 6,988,275.

(30) Foreign Application Priority Data

Aug. 15, 2001 (JP) .......................... P2001-246657

(51) Int. Cl.
*G11B 7/08* (2006.01)
(52) U.S. Cl. .................................... 720/682
(58) Field of Classification Search ................. None
See application file for complete search history.

(56) References Cited

U.S. PATENT DOCUMENTS

| 5,524,004 | A | 6/1996 | Van Rosmalen |
| 5,598,397 | A | 1/1997 | Sim |
| 5,715,231 | A | 2/1998 | Nagasato et al. |
| 6,342,978 | B1 | 1/2002 | Nishikawa et al. |
| 2001/0048657 | A1 | 12/2001 | Ohtsuka |
| 2001/0050899 | A1 | 12/2001 | Ito et al. |

FOREIGN PATENT DOCUMENTS

| JP | 6-52562 | 2/1994 |
| JP | 9-251653 | 9/1997 |

*Primary Examiner*—Davis Davis
(74) *Attorney, Agent, or Firm*—Rader Fishman & Grauer PLLC; Ronald P. Kananen

(57) ABSTRACT

The apparatus and methods of the present invention provide for a biaxial actuator, an optical pickup device, and an information optical processing device, in which the biaxial actuator is favorably mounted using a single structure. The mounting structure includes first fastening portions protruding from a bottom plate affixed to a substrate. Connecting portions are provided in the first fastening portions through first stress concentration points. The connecting portions are also provided in second fastening portions through second stress concentration points. A mounting portion is provided between the second fastening portions and yokes are formed on the bottom plate to establish a magnetic circuit. A fixing portion of the biaxial actuator is mounted on the mounting portion. By deforming each stress concentration point, a reference state of the objective lens can be determined at an arbitrary position.

4 Claims, 6 Drawing Sheets

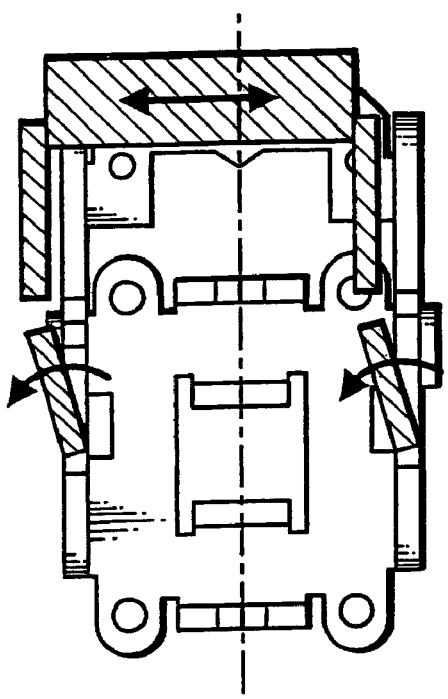
FIG. 3C
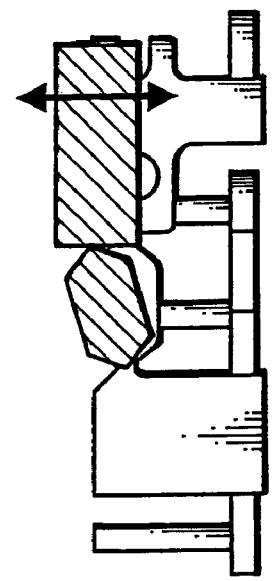
FIG. 3D
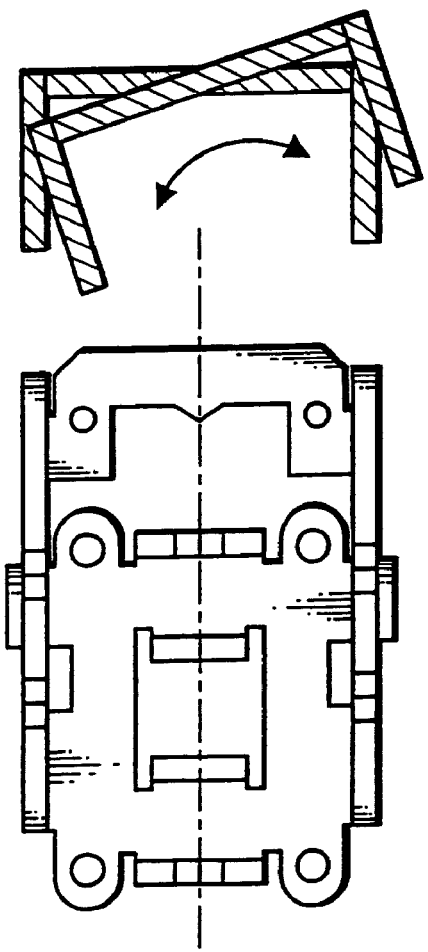
FIG. 3A
FIG. 3B
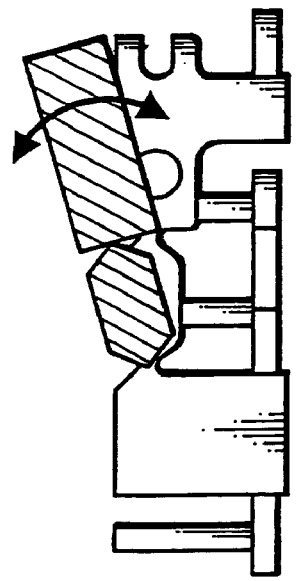

BIAXIAL ACTUATOR APPARATUS AND A METHOD FOR MOUNTING AND ADJUSTING THE BIAXIAL ACTUATOR

This application is a divisional application of U.S. patent application Ser. No. 10/398,688 filed on Apr. 8, 2003, now U.S. Pat. No. 6,988,275, issued on Jan. 17, 2006, which is a national stage application under 35 U.S.C. §371 of International Application No. PCT/JP02/08302 filed on Aug. 15, 2002, based on Japanese application P2001-246,651, the priority of which is claimed, the contents of which are hereby incorporated in its entirety by reference.

TECHNICAL FIELD

The present invention relates to a biaxial actuator, an optical pickup device and an information optically-processing device, in which a biaxial actuator, into which an objective lens, for example, used for recording and/or reproducing on an optical disk is loaded, is favorably mounted without difficulties, and particularly to a biaxial actuator, an optical pickup device and an information optically-processing device suitable for use in, for example, an optical disk recording and/or reproducing apparatus.

BACKGROUND ART

For example, in a biaxial actuator, in which an objective lens is loaded, of an optical disk recording and/or reproducing apparatus, the objective lens needs to be mounted after inclination thereof is adjusted to become the reference state in radial and tangential directions with respect to a disk surface while the biaxial actuator is not being driven. Namely, such adjustment and mounting enables the driving performance on the objective lens by the biaxial actuator to be the most efficient.

As the above-described biaxial actuator, the applicants of the present invention previously proposed relevant technology disclosed in Japan Utility Model Application Laid-Open No. Sho-62-150723 and Japan Patent Application Laid-Open No. Hei-9-251653. Specifically, in the former application, as shown in FIG. 5, a spherical shaft portion 45 (convex-spherical surface), a spherical bearing portion 46 (concave-spherical surface), and adjusting screws 35 and 36 are used to adjust inclination in the radial and tangential directions of an objective lens provided in a biaxial actuator 20 with respect to a disk surface. Also, in the latter application, as shown in FIG. 6, it is arranged that the similar adjustment is performed by first and second plates.

Specifically, in a state where the above-described biaxial actuator is not being driven, a light beam is irradiated through the objective lens onto a surface of a disk for adjustment, and then the reflected light beam or the like is detected to adjust the inclination of the objective lens to be in a reference state in radial and tangential directions with respect to the disk surface. Then, in the state where such adjustment has been done, the convex-spherical surface and the concave-spherical surface are fixed together with the adjusting screws or the like. Alternatively, the first and second plates are joined together using solder or the like to determine the reference state of the objective lens.

However, in the above-described biaxial actuators, there are required a plurality of components such as the convex-spherical surface and concave-spherical surface, or the first and second plates. In addition, with respect to surfaces between those components, it is required to perform surface processing in order that the adjustment is performed without difficulties and the joining using solder or the like is efficiently performed. As a result, there is a possibility that the cost of such components or the like may increase. Further, when the joining is performed by using solder or the like, there is also a great possibility that, for example, the optical components such as an objective lens are contaminated if the solder or the like is scattered.

The present application has been made in view of the above-described problems, and the problems to be solved are that: in conventional devices there has been required a plurality of components such as the convex-spherical surface and concave-spherical surface, or the first and second plates; then there has been a possibility of increase in the cost of those components in order to perform surface processing or the like on surfaces for joining; and there is further a possibility of contamination of the optical components such as the objective lens or the like if solder or the like is scattered when joining is performed.

DISCLOSURE OF INVENTION

Claim 1 of the present invention is a biaxial actuator, in which a fixing portion, in which an objective lens is loaded, is mounted on a mounting portion provided between two arms each of which is formed with at least two stress concentration points.

Accordingly, by plastically deforming each of the stress concentration points, the objective lens in a reference state can be determined at an arbitrary position and the biaxial actuator is favorably mounted without difficulties using a single member.

According to claim 2 of the present invention, since the reference state of the objective lens is determined by plastically deforming the stress concentration points, adjustment of the objective lens to the reference state is performed extremely easily.

According to claim 3 of the present invention, since a yoke is provided to form a magnetic circuit together with the two arms each formed with the two stress concentration points and the mounting portion, the magnetic circuit can also be formed without difficulties.

Further, according to claim 4 of the present invention, since the two arms each including the two stress concentration points and the mounting portion are formed by processing a sheet metal through pressing and bending, a mounting member can be formed without difficulties.

Further, claim 5 of the present invention is an optical pickup device having a lens holder which holds an objective lens and detection means for detecting a light beam passing through the objective lens, in which a fixing portion of a biaxial actuator, on which an objective lens is loaded, is mounted on a mounting portion provided between two arms each of which is formed with at least two stress concentration points.

As a result, by plastically deforming each of the stress concentration points, the objective lens in a reference state can be determined at an arbitrary position and the biaxial actuator is favorably mounted without difficulties using a single member.

Further, According to claim 6 of the present invention, since the reference state of the objective lens is determined by plastically deforming the stress concentration points, adjustment of the objective lens to the reference state is performed extremely easily.

Further, According to claim 7 of the present invention, since a yoke is provided to form a magnetic circuit together with the two arms each formed with the two stress concentration points and a mounting portion, the magnetic circuit can also be formed without difficulties.

Further, according to claim 8 of the present invention, since the two arms each including the two stress concentration points and the mounting portion are formed by processing a sheet metal through pressing and bending, a mounting member can be formed without difficulties.

Furthermore, claim 9 of the present invention is an information optically-processing device in which an information signal is recorded and/or reproduced by a light beam radiated through an objective lens, wherein a fixing portion of a biaxial actuator, in which an objective lens is loaded, is mounted on a mounting portion provided between two arms each of which is formed with at least two stress concentration points.

As a result, by plastically deforming each of the stress concentration points, the objective lens in a reference state can be determined at an arbitrary position and the biaxial actuator is favorably mounted without difficulties using a single member.

Further, According to claim 10 of the present invention, since the reference state of the objective lens is determined by plastically deforming the stress concentration points, adjustment of the objective lens to the reference state is performed extremely easily.

Further, According to claim 11 of the present invention, since a yoke is provided to form a magnetic circuit together with the two arms each formed with the two stress concentration points and a mounting portion, the magnetic circuit can also be formed without difficulties.

Further, according to claim 12 of the present invention, since the two arms each including the two stress concentration points and the mounting portion are formed by processing a sheet metal through pressing and bending, a mounting member can be formed extremely easily.

BRIEF DESCRIPTION OF THE DRAWINGS

FIGS. 3A to 3D are views for describing the operation of the biaxial actuator;

BEST MODE FOR CARRYING OUT THE INVENTION

In the present invention, a fixing portion of a biaxial actuator, in which an objective lens is loaded, is mounted on a mounting portion provided between two arms each formed with at least two stress concentration points, and therefore by plastically deforming each of the stress concentration points, the objective lens in a reference state can be determined at an arbitrary position and the biaxial actuator is favorably mounted without difficulties using a single member.

Figure 1:
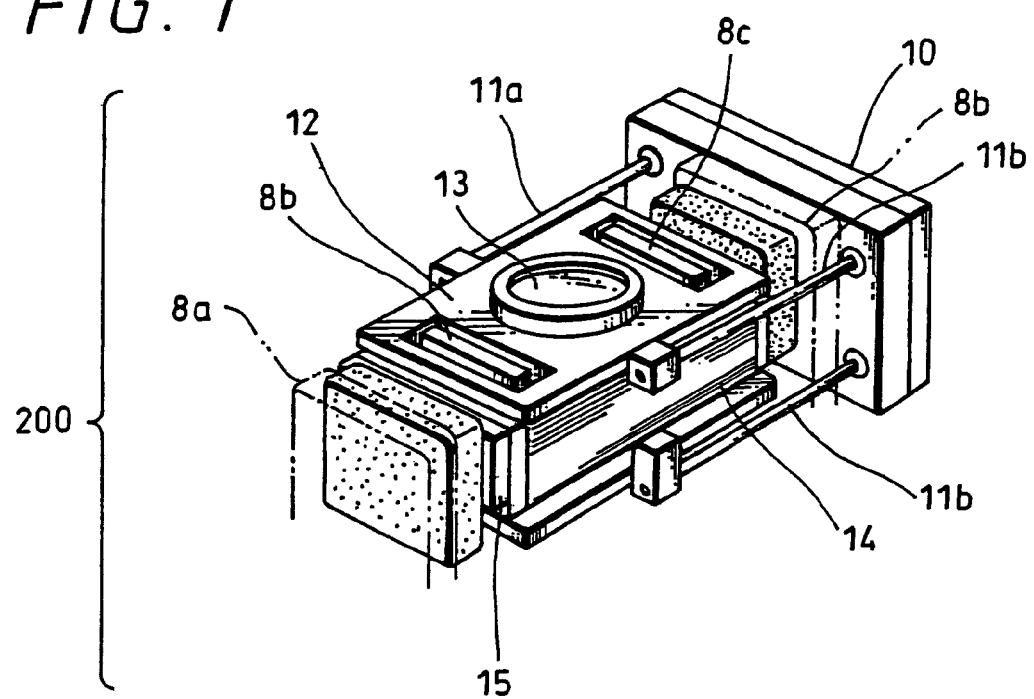
FIG. 1 is a perspective view illustrating the construction of an embodiment of a biaxial actuator to which the present invention is applied.
Figure 1:
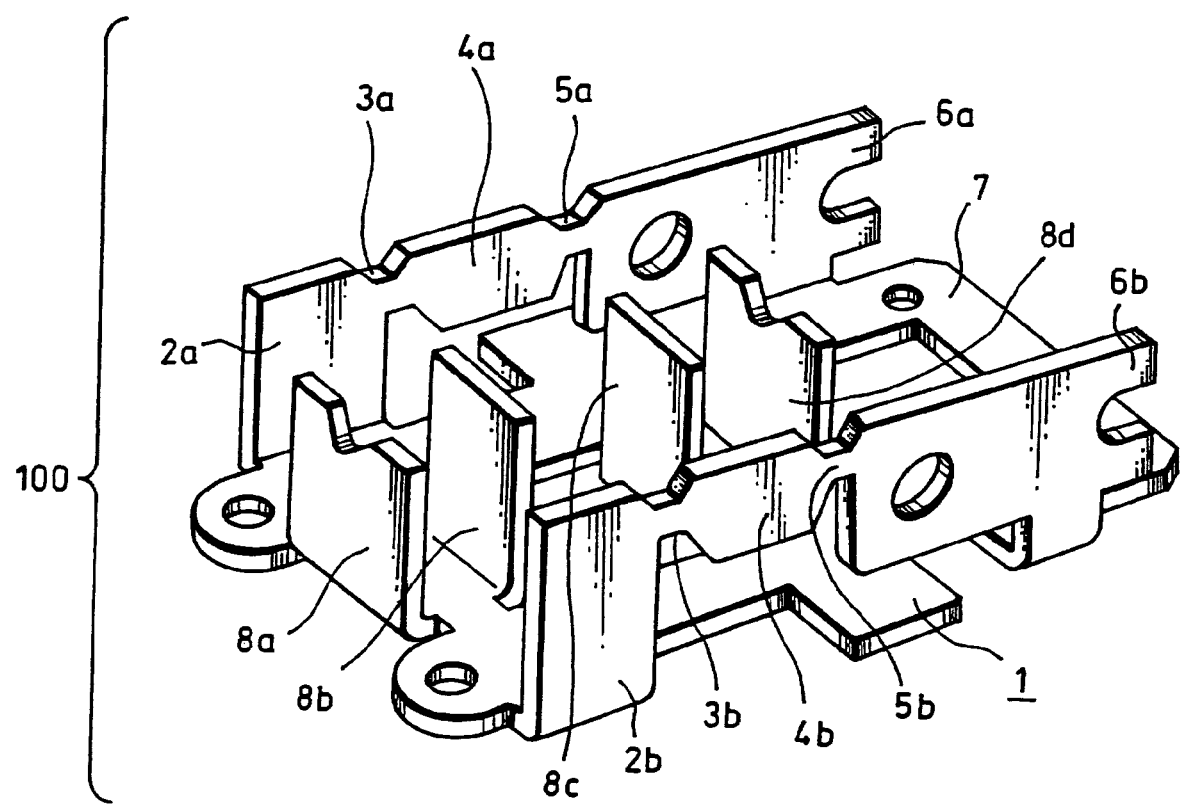

Hereinafter, the present invention will be explained with reference to the drawings. FIG. 1 is a perspective view illustrating the construction of an embodiment of a biaxial actuator to which the present invention is applied. In FIG. 1, a mounting member and the biaxial actuator are shown in an exploded manner for convenience of the explanation. That is, in FIG. 1, a mounting member 100 is illustrated at the lower part of the figure, while on the upper side the construction of a biaxial actuator 200 is illustrated.

As shown in FIG. 1, on the mounting member 100, there are provided first fastening portions 2a, 2b rising from a bottom plate portion 1 which is fixed to a substrate (not illustrated in the figure). In the first fastening portions 2a, 2b connecting portions 4a, 4b are provided through first stress concentration points 3a, 3b. Further, in those connecting portions 4a, 4b second fastening portions 6a, 6b are provided through second stress concentration points 5a, 5b. Then, a mounting portion 7 is provided between those second fastening portions 6a, 6b.

Figure 2A:
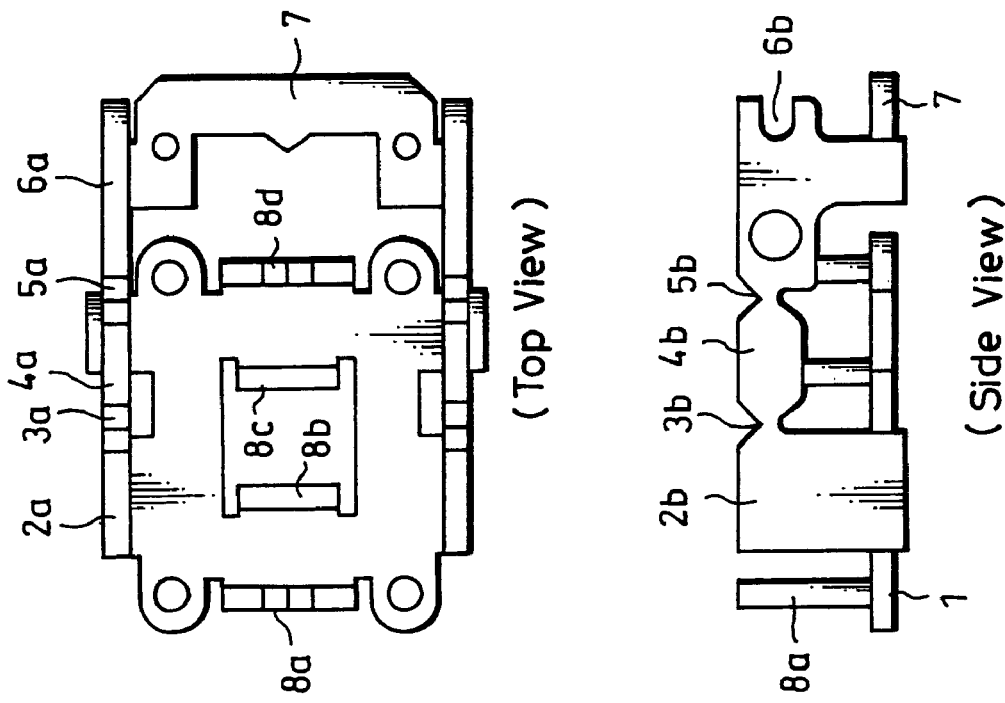
FIGS. 2A and 2B are views for describing the biaxial actuator.
Figure 2B:
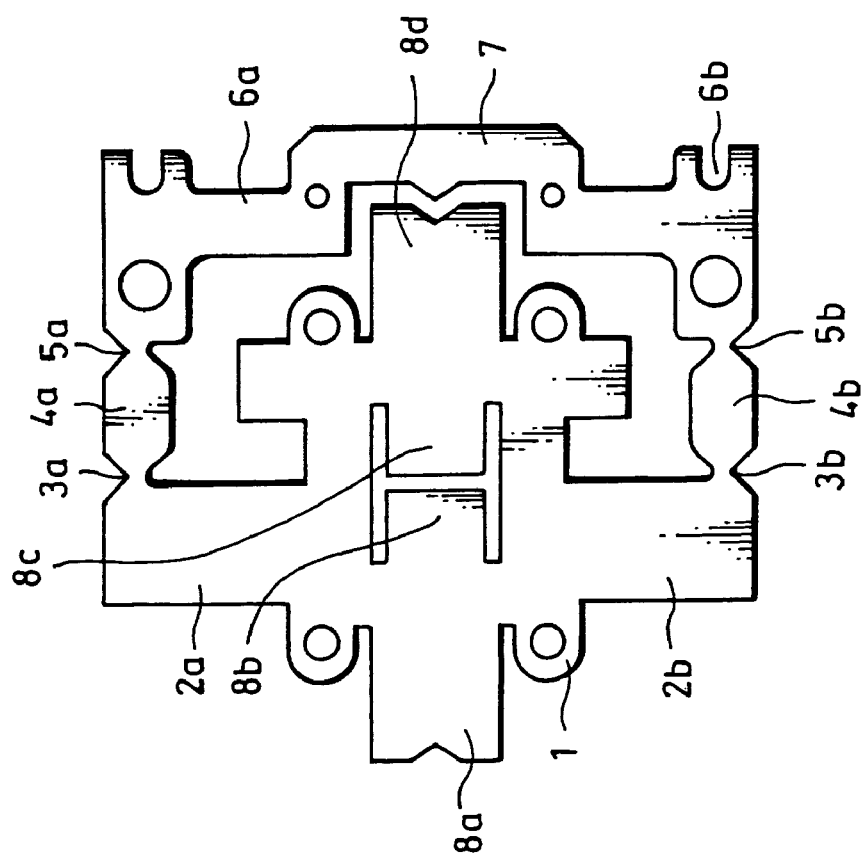

Here, as shown in a development view of FIG. 2A and a top and side views of FIG. 2B, the mounting member 100 is formed by processing, for example, a sheet metal through pressing and bending. Further, the stress concentration points 3a, 3b and 5a, 5b are formed by reducing the thickness thereof to approximately 50% when the processing of, for example, pressing is performed, and are made to have the shape capable of being adjusted by plastic deformation in which a load of, for example, approximately 1 kg of weight=10N is applied. Accordingly, if the similar extent of plastic deformation can be obtained, the thickness is not necessarily reduced. However, the maximum load that is assumed to be applied under the circumstance of ordinary use is 500 g of weight.

Further, yokes 8a, 8b, 8c, and 8d for constituting a magnetic circuit are formed by bending the bottom plate portion 1. It is noted that, although in the development view of FIG. 2A the length of the yokes 8b, 8c is shorter than that of the yokes 8a, 8d, the length of former yokes can be made similar to those of latter yokes by, for example, processing of embossing. Then, magnets (not illustrated in the figures) are mounted on those yokes 8a to 8d to form a magnetic circuit. Accordingly, although the mounting member is conventionally formed using magnetic metal such as iron, if driving is performed only using magnets, the member can be formed of a non-magnetic metal.

Then, a fixing portion 10 of the biaxial actuator 200 is mounted on the above-described mounting portion 7. Further, a lens holder 12 is connected to the fixing portion 10 through support members 11a, 11b. Then, an objective lens 13 and a coil bobbin 14 for driving are provided in the lens holder 12. Accordingly, the lens holder 12 is constructed to be movable by the support members 11a, 11b in the upper and lower direction (direction of optical axis) and in the right and left direction, and the movement of the above holder is controlled by the magnetic circuit formed by the focusing coil 14, tracking coil 15 and yokes 8a to 8d according to the electric current flowing through the focusing coil 14 and tracking coil 15.

Adjusting the reference state of the objective lens 13 with respect to the mounting member 100 is performed employing an adjusting jig (not shown in the figures) allowed to have a play about the above-described mounting portion 7. Then, by repeatedly applying a load of 1 kg weight=10N or more in a required direction through the above-described adjusting jig, gradually the stress concentration points 3a, 3b and 5a, 5b are plastically deformed, thereby desired adjustment being executed.

Specifically, for example, in a state where the coil bobbin 14 of the biaxial actuator 200 is not being driven, a light beam is irradiated through the objective lens 13 onto a surface of a disk for adjustment (not illustrated in the figure), and the reflected beam or the like is detected to obtain the inclination in the radial and tangential directions with respect to the disk surface. Then, the adjusting jig is moved such that the inclination of radial and tangential directions is brought to the reference state, and a load is applied in the required direction, thereby the stress concentration points 3a, 3b and 5a, 5b being plastically deformed to execute the adjustment.

Hereupon, in the above-described adjustment, there can be performed not only the adjustment, as illustrated in FIG. 3A, of the inclination of the objective lens with respect to the disk surface in radial direction, and the adjustment, as illustrated in FIG. 3B, of the inclination of the objective lens with respect to the disk surface in tangential direction, but also the adjustment, as illustrated in FIG. 3C, of the position of the objective lens in the tracking direction, and further, the adjustment, as illustrated in FIG. 3D, of the height of the objective lens. That is, since plastic deformation is arbitrarily performed with respect to the stress concentration points 3a, 3b and 5a, 5b, those adjustments are performed without difficulties.

In this embodiment, since the fixing portion of the biaxial actuator in which the objective lens is loaded is mounted on the mounting portion provided between two arms each formed with at least two stress concentration points, by plastically deforming each of the stress concentration points, the objective lens in a reference state can be determined at an arbitrary position and the biaxial actuator is favorably mounted using a single member without difficulties.

Accordingly, although in conventional devices a plurality of such components as the convex-spherical surface and concave-spherical surface, or the first and second plates are required; further in order to perform surface processing or the like on surfaces between those components, there is a possibility that the cost of such components or the like may increase; and there is also a great possibility that the optical components such as an objective lens are contaminated when the solder or the like for joining is scattered, according to the present invention those problems can be solved without difficulties.

As described above, since the above-mentioned biaxial actuator includes: the lens holder which holds the objective lens, the support members which support the lens holder with respect to the fixing portion such that the lens holder may be displaceable at least in the direction of optical axis of the objective lens, and the mounting member having the two arms each of which are formed with at least two stress concentration points, the objective lens in a reference state can be determined at an arbitrary position by plastically deforming those stress concentration points, respectively, whereby using the single mounting member the biaxial actuator can be favorably mounted without difficulties.

Figure 4:
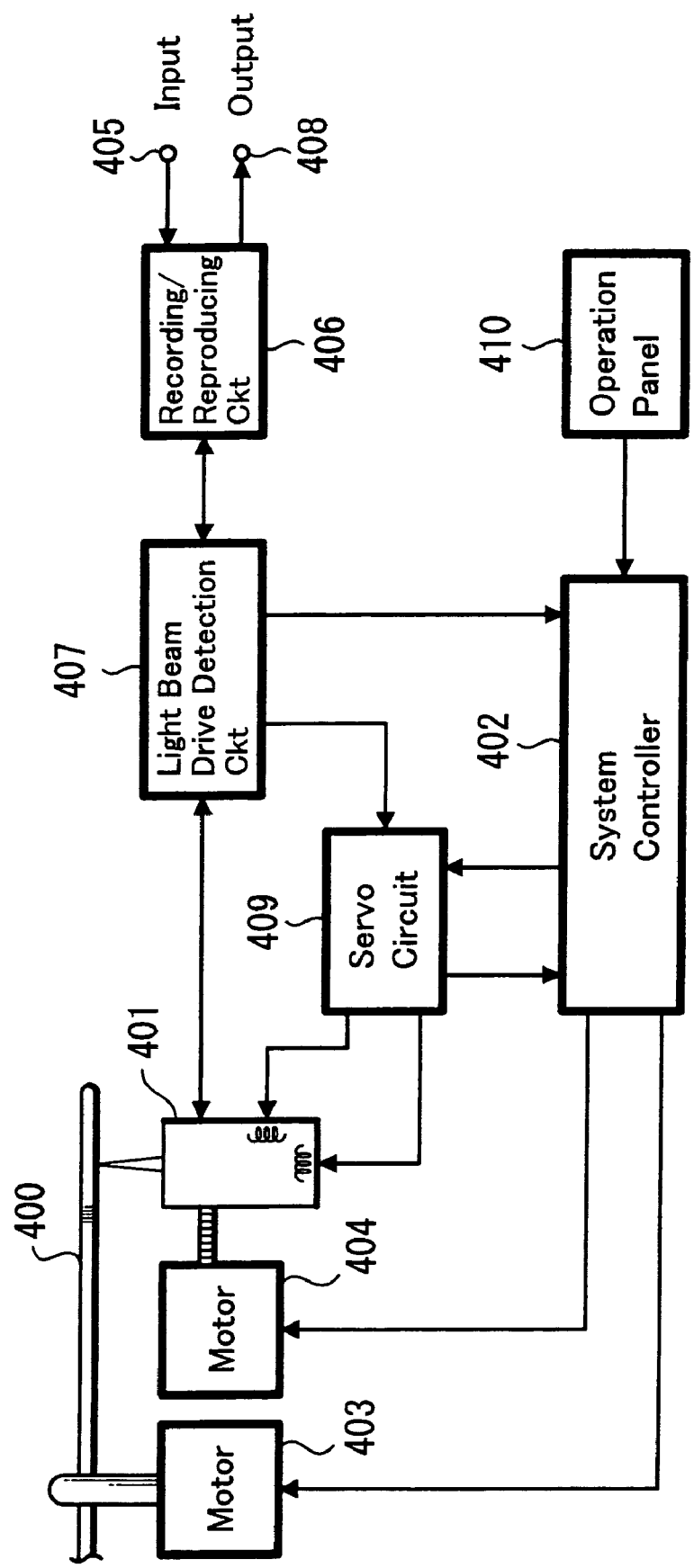
FIG. 4 is a block diagram illustrating the construction of an embodiment of an information optically-processing device to which the present invention is applied.
Figure 5A:
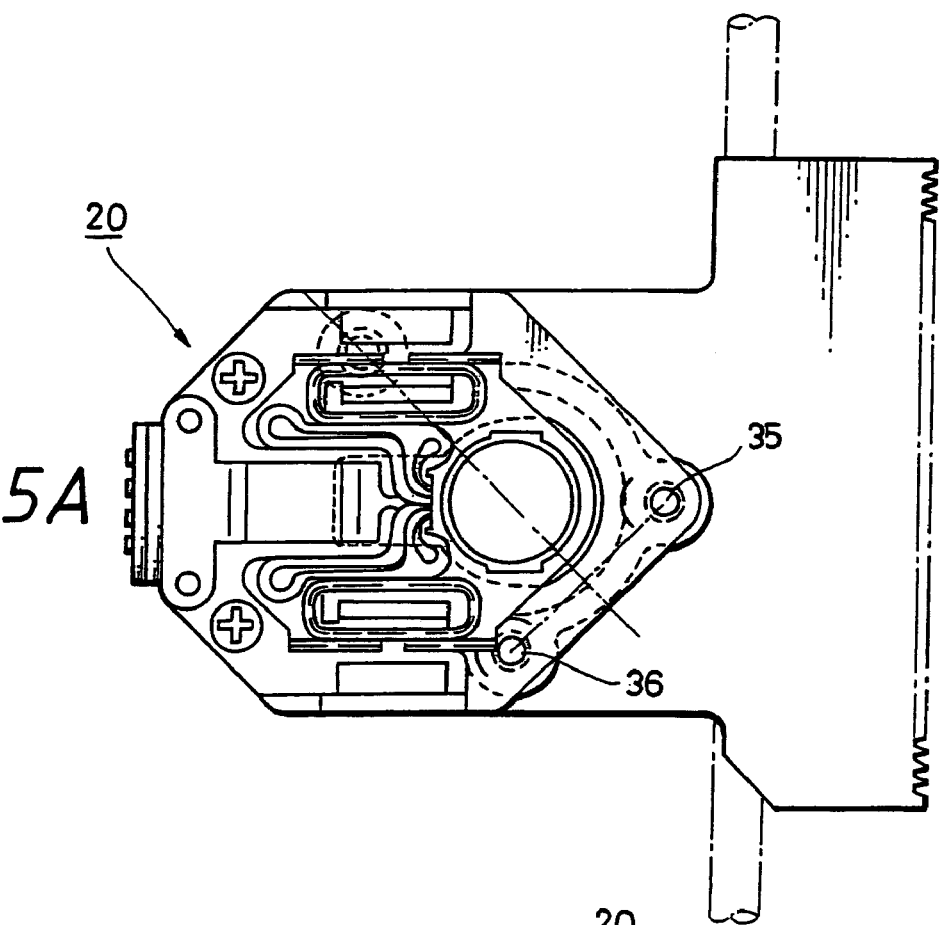
FIGS. 5A and 5B are constitutional diagrams of a mounting member for mounting a conventional biaxial actuator.
Figure 5B:
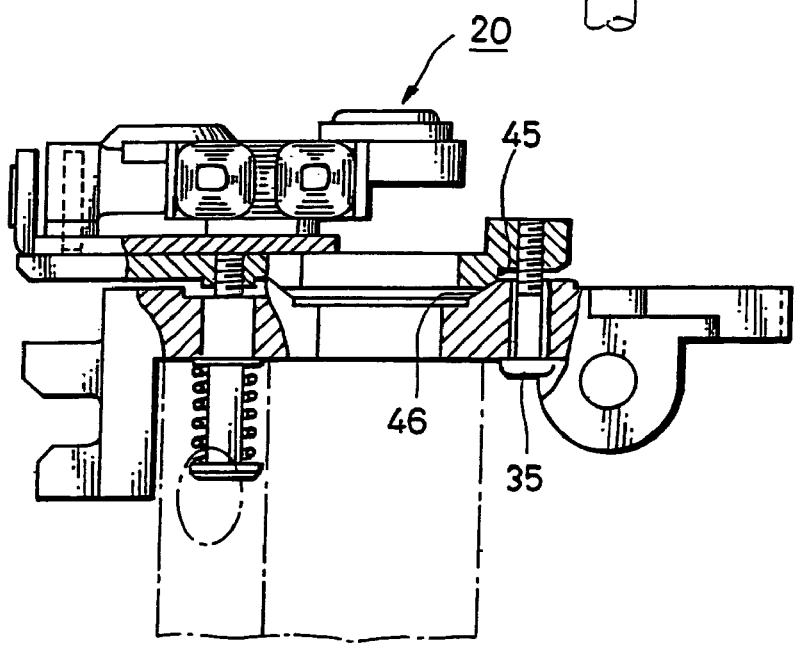
Figure 6:
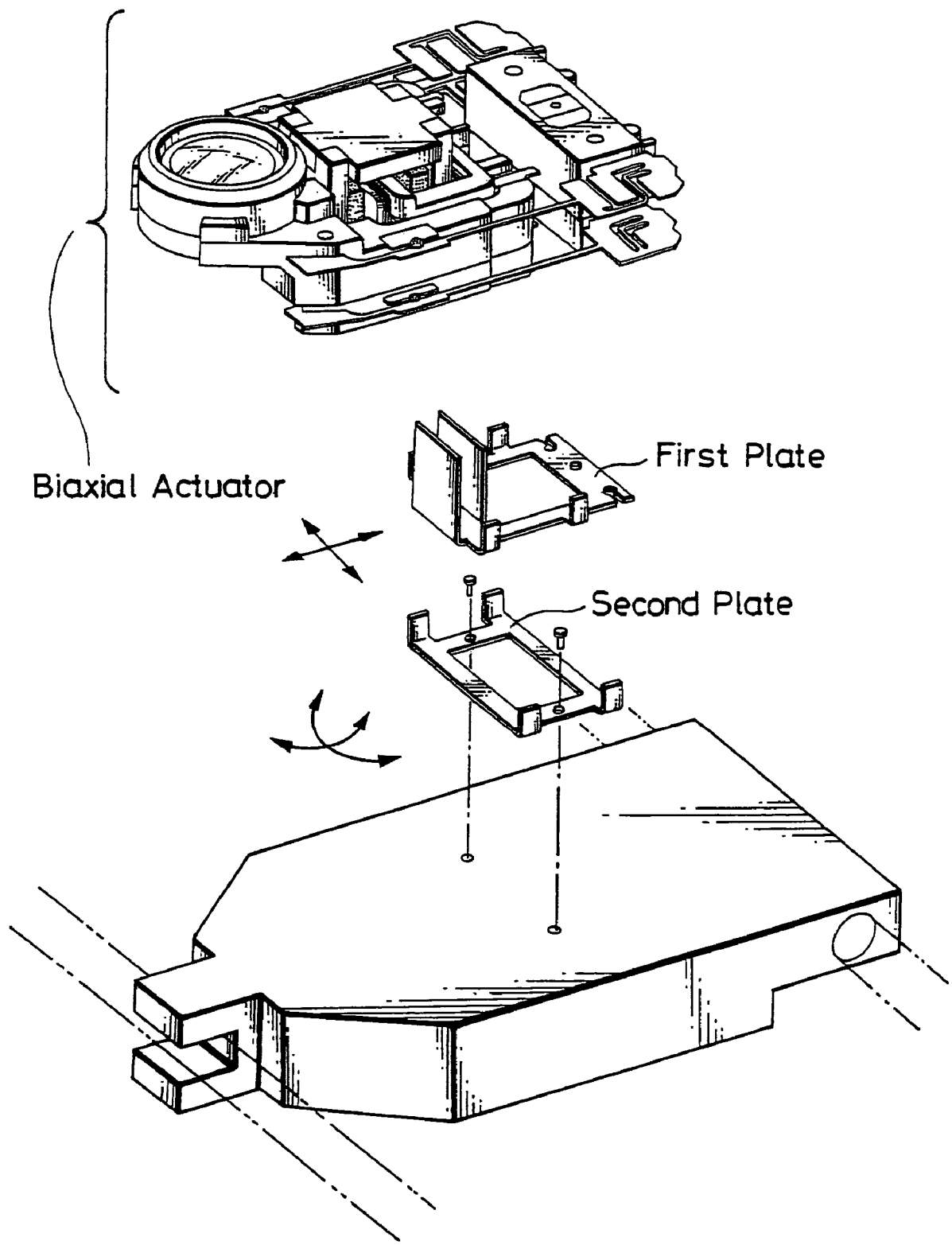
FIG. 6 is a constitutional diagram of a mounting member for mounting a conventional biaxial actuator.

Further, in the present invention, it is possible to construct an information optically-processing device using the above-described biaxial actuator. Namely, FIG. 4 shows a schematic construction of an embodiment of the information optically-processing device according to the present invention. In FIG. 4, on a recording disk 400 a light beam from an optical pickup device 401 including the above-described objective lens actuator is irradiated to record and/or reproduce an information signal.

On the other hand, the above recording disk 400 is driven to rotate by a spindle motor 403 which is driven according to a control signal supplied from a system controller 402, for example, such that the linear velocity may be kept constant. Further, by a feed motor 404 which is driven according to a control signal from the system controller 402, the optical pickup device 401 is moved such that a light beam from the optical pickup device 401 may be irradiated onto a desired position on the recording disk 400.

Then, for example, an information signal from an input terminal 405 is supplied to a light beam drive detection circuit 407 through a recording and reproducing circuit 406, and then according to a signal from the drive detection circuit 407 the output of the light beam at the optical pickup device 401 is controlled, thereby on the recording disk 400 the information signal from the input terminal 405 being recorded. Further, the information signal recorded on the recording disk 400 is detected by the drive detection circuit 407, and the detected information signal is obtained at an output terminal 408 through the recording and reproducing circuit 406.

Together with the above operation, in the drive detection circuit 407, tracking and focusing error signals of the light beam are detected and those error signals are supplied to a servo circuit 409. Then, a control signal from the servo circuit 409 is supplied to the optical pickup device 401, thereby tracking and/or focusing being driven and controlled. Further, an operation signal from an operation panel 410 is supplied to the system controller 402 to move the optical pickup device 401 to a desired recording position or a reproducing position, for example.

Further, also in this information optically-processing device, since in a biaxial actuator provided on the above-described optical pickup device 401, a fixing portion of the biaxial actuator, in which an objective lens is loaded, is mounted on the above-described mounting portion provided between two arms each of which are formed with at least two stress concentration points, the objective lens in a reference state is determined at an arbitrary position by plastically deforming the stress concentration points, respectively, and the biaxial actuator can be favorably mounted using the single mounting member without difficulties.

Consequently, according to the above-described information optically-processing device, there is provided an information optically-processing device in which recording and/or reproducing an information signal is performed by a light beam irradiated through the objective lens, and the device includes the support members which support the lens holder to be displaceable at least in the direction of optical axis of the objective lens with respect to the fixing portion, and the mounting member on which the fixing portion is mounted, having two arms each of which is formed with at least two stress concentration points, whereby mounting of the biaxial actuator can be favorably performed using the single mounting member without difficulties.

The present invention is not limited to the embodiments described above, and can take various modifications without departing from the gist of the present invention.

The invention claimed is:

1. A method for adjusting a biaxial actuator mounted on a mounting member, comprising the steps of:
   irradiating a light beam onto a surface of a disk to produce reflected light beams;
   detecting inclination directions of the disk surface based on the reflected light beams;
   moving an adjusting jig such that the inclination directions are at a predetermined reference; and
   deforming concentration points of the mounting member based on the moved adjusting jig.

2. The method of claim 1, wherein the light beam is irradiated through an objective lens.

3. The method of claim 1, wherein the inclination directions of the disk surface include a radial direction and a tangential direction.

4. The method of claim 1, further comprising the step of:
applying a load to the adjusting jig in a predetermined direction.

* * * * *

UNITED STATES PATENT AND TRADEMARK OFFICE
CERTIFICATE OF CORRECTION

PATENT NO. : 7,185,349 B2  Page 1 of 1
APPLICATION NO. : 11/188903
DATED : February 27, 2007
INVENTOR(S) : Koji Mitsumori et al.

It is certified that error appears in the above-identified patent and that said Letters Patent is hereby corrected as shown below:

Column 1:
Line 10, "application P2001-246,651" should read -- application P2001-246657 --.

Signed and Sealed this

Seventh Day of August, 2007

JON W. DUDAS
*Director of the United States Patent and Trademark Office*